United States Patent [19]

Kubänek et al.

[11] 4,177,295

[45] Dec. 4, 1979

[54] METHOD FOR STABILIZING COLLOIDAL AND TASTE QUALITIES OF BEVERAGES

[75] Inventors: Vladimir Kubänek, Kralupy n. Vlt.; Gabriela Basařová, Prague; Jaroslav Králiček, Prague; Josef Skach, Prague; Zdenek Fencl, Prague; Jíři Budin, Sezimovo Usti; Jaroslava Kondeliková, Prague; Eduard Sittler, Sezimovo Usti, all of Czechoslovakia

[73] Assignee: Vysoka skola chemicko-technologicka, Prague, Czechoslovakia

[21] Appl. No.: 898,413

[22] Filed: Apr. 20, 1978

[51] Int. Cl.² ............................................. A23L 1/26
[52] U.S. Cl. .................................. 426/330.3; 426/422; 426/590; 528/309; 252/356

[58] Field of Search ............... 426/330.3, 330.4, 330.5, 426/271, 422, 12, 590, 592, 493; 528/309; 252/356

[56] References Cited

U.S. PATENT DOCUMENTS

| 3,512,988 | 5/1970 | Yomo et al. | 426/330.4 |
| 3,551,351 | 12/1970 | Murray et al. | 426/422 |
| 3,674,502 | 7/1972 | Honey et al. | 426/330.3 |

*Primary Examiner*—Raymond N. Jones
*Assistant Examiner*—Elizabeth A. Hatcher

[57] ABSTRACT

A method for treating beverages containing turbidity procursors and/or enzymes is described. The technique involves contacting the beverages with a diol or dicarboxylic acid polycondensate at a temperature ranging from 28.4° to 176° F., thereby resulting in separation of deleterious substance. The colloidal and taste qualities of the resultant beverages is thereby enhanced.

13 Claims, No Drawings

METHOD FOR STABILIZING COLLOIDAL AND TASTE QUALITIES OF BEVERAGES

This invention relates to a method for stabilizing beverages. More particularly, the present invention relates to a method for stabilizing the colloidal and taste qualities of beverages.

Studies of common beverages reveal the presence of colloidal substances which are responsible for the formation of non-biological sediments or cloudiness therein. Additionally, oxidation of such substances tends to impair the organoleptic properties of beverages. Typical procursors of colloidal cloudiness include polypeptides, polyphenols and polysaccharides and sedimentation or cloudiness is found to be promoted and accelerated by the presence of oxygen, high temperatures and certain metal ions.

Heretofore, the colloidal stability of common beverages, such as beer, wine and the like has been enhanced by the use of stabilizers, the prime purpose of which is to remove high molecular weight substances which are unstable in solution. Typical techniques for obviating the colloidal cloudiness follow.

Reduction of the concentration of cloudiness attributable to polypeptides may be effected by the use of adsorbents based upon silica gel and bentonite or precipitants or coagulants such as tannin and enzymatic agents which tend to cleave high molecular weight substances to low molecular weight components which are either stable in solution or soluble.

With respect to the reduction of polyphenol concentration, adsorbents based upon polyvinyl pyrrolidone or a precipitant such as formaldehyde is employed. Oxidation changes in beverages may be effectively avoided by the use of carbon dioxide environments or antioxidants such as ascorbic acid, sulfur dioxide and the like.

In light of the fact that adsorbents such as silica gels and bentonites are resoluble, health protection rules impose limitations on their use. Accordingly, they are employed either as constituents of filtering materials such as diatomaceous earth, during maturation of the product or in collecting and pressurized tanks prior to the bottling process. Although silica gel based adsorbents are substantially inert from the standpoint of the chemical and organoleptic properties of beverages, the use of bentonites is frequently accompanied by taste modification of the product. Thus, beer treated with bentonite may evidence an earthy flavor and a reduction in degree of foaming.

Similarly, the precipitants such as formaldehyde and the like are prohibited from use in foodstuffs by the laws of many countries. The enzyme based stabilizers which comprise a proteolytic enzyme as the essential component, most commonly, papain, are used in the form of soluble substances that are prepared in a catalyzed reaction or by heating to a temperature sufficient to denature the enzyme. Unfortunately, the potential contamination from by-products of the enzymatic catalysis also restricts their use. Nevertheless, under certain circumstances the use of enzymes cannot be avoided.

An example of enzyme use occurs in the cleavage of pectines by pectinase in juice pressing processes or in the stabilization of beer by a protease additive. Vegetable and animal enzymes such as amylase from malt or rennase from calf's gastric juices have also been used; however, economic limitations severely restrict such usage, so suggesting the use of enzymes of microbial origin for the purposes intended.

These enzymes have been used to some extent heretofore but they too suffer from inherent limitations. Thus, for example, long term contact with the respective beverages is often accompanied by an undesirable cleavage of substrates and by by-product formation which alters the characteristics of the final product or results in a product which may be harmful from a health standpoint. Thus, when using enzymes, it is imperative that they be deactivated as quickly as possible after fulfilling their task, typically by heating to temperatures sufficient to denature the proteins in the enzyme. Undesirable enzyme activity may also be inhibited by the use of inhibitors but, once again, such use in foodstuffs is precluded because of toxicity.

Accordingly, workers in the art have long sought to develop a procedure for stabilizing the colloidal and taste qualities of beverages while simultaneously deactivating enzymes.

In accordance with the present invention, the prior art limitations are effectively obviated and the foregoing objects are attained by means of a novel method. Briefly, the inventive method involves contacting a beverage containing precursors of cloudiness and/or enzymes at a temperature ranging from $-2°$ C. to $80°$ C. ($28.4°$ to $176°$ F.) with an organic polymeric substance of a polycondensate based upon diols and dicarboxylic acids, polyethylene terephthalate or derivatives thereof being preferred for this purpose. Following, the polymeric materials are separated from the liquid medium. In this manner, the polyphenol precursor content and enzyme deactivation is effected, so obviating negative beverage flavors.

The noted polymeric materials may be employed as a sole stabilizer or alternatively in combination with other stabilizers. It may also be employed as a filtering material or in combination with organic or inorganic filtering materials that are insoluble in water, diatomaceous earth being suited for this purpose. The inventive stabilizer may also be used in powder form prior to filtering and, subsequently, separation thereof effected by sedimentation, filtering or centrifuging.

The desired contact with polymeric materials may be effected in several forms. Thus, for example, polyphenol and enzyme concentration in beverages may be reduced by flowing the beverage over fabrics produced from the noted polymeric materials or, alternatively, by passing the beverage over sheets having in-pressed pulverulent or fibrous polymers. Other contact procedures include permitting the solution to be treated to flow through columns filled with the polymeric material or through vessels filled with an adsorbent. A convenient means for attaining this end involves building an adsorbent in the form of a pipeline through which the liquid flows.

The properties alluded to hereinabove are not evidenced by monomers or polymerization catalysts but solely by macromolecules. In other words, adsorption of polyphenols and deactivation of enzymes can only be attained by use of macromolecular material of the type described above.

As noted, reduction of polyphenol concentration in beverages enhances colloidal stability by inhibiting sedimentation and cloudiness and increases the stability of the organoleptic properties thereof while decreasing the likelihood of oxidation. It has been found that the products of oxidation adversely affect the taste qualities of beverages.

Although the amount of polymeric material is not critical, considerations relating to the need to reduce the concentration of cloudiness precursors or the concentration of undesirable enzymes such as papain or bacterial anylases or pectinases control. Similarly, the described treatment may be employed in any phase of the manufacturing process without regard to temperature or pH value.

Several examples of the present invention are set forth below. It will be appreciated by those skilled in the art that the exemplary embodiments are by way of exposition only and are not to be construed as limiting.

EXAMPLE 1

Deactivation of Alpha-Amylase BACILLUS SUBTILIS 2.5 ml. of an aqueous enzyme solution containing 5 enzyme units in one milliliter was increased to a volume of 5 ml. with an aqueous buffer solution of pH 5.5 and then with water to a volume of 20 ml. Then, 0.1 g of pulverized polyethylene terephthlate having a molecular weight of 38,100 was added to the solution whereupon it was agitated for 5 minutes and finally filtered. A clear filtrate resulted and did not evidence an amylase activity. Pulverized polyethylene terephthalate in combination with polybutylene terephthalate was then employed with similar results.

EXAMPLE 2

Deactivation of Papain

To 100 ml. of an aqueous enzyme solution containing 0.2 g of papain concentrate having 2.250 enzyme units in one gram, there was added 1.5 g of modified polyethylene terephthalate containing 5 mols. of isophthalic acid as a modifying component. The solution was then allowed to stand for 30 minutes. Within this time interval, the enzyme activity attained a value of about zero.

EXAMPLE 3

Degradation of Pectinase Activity

Reference test:

To 7 ml of a one percent pectin solution, one milliliter of pectinase solution prepared by dissolving 4 mg of enzymatic preparation in 2 ml water, and cleared by centrifuging was added. Immediately after mixing in a Hoppler falling-ball viscosimeter, the ball passage period was examined at a constant temperature of 30° C. over three minute time intervals. The results were as follows:

| time interval (min.) | ball passage period (min.) |
| --- | --- |
| 0 | 2.36 |
| 3 | 2.08 |
| 6 | 1.48 |
| 9 | 1.36 |
| 12 | 1.27 |

Test:

To 5 ml. of a pectinase solution (2 mg/ml), there was added 0.5 g of pulverized polyethylene terephthalate in which 4% of terephthalate units were replaced by adipate units. The resultant solution was agitated for 10 minutes at room temperature. After the sediment had been centrifuged off, one milliliter of clear solution was added to 7 ml of a one percent pectin solution and viscosity was again measured over three minute intervals at 30° C. The results were as follows:

| time interval (min.) | ball passage period (min.) |
| --- | --- |
| 0 | 2.39 |
| 3 | 2.38 |
| 6 | 2.33 |
| 9 | 2.28 |
| 12 | 2.23 |

Comparison with the reference test reveals a substantial decrease in pectinase activity.

EXAMPLE 4

Reduction of Polyphenol Concentration in Beer 10 liters of beer were mixed for 30 minutes with 10 g of a pulverized copolymer having a molecular weight of 15,000 (prepared from ethylene glycol of terephthalic acid and 3.9% of sulfoisophthalic acid). After filtration, a 13.5 percent decrease in polyphenol concentration was noted.

EXAMPLE 5

One liter of wine was mixed for 30 minutes with 2 g of a pulverized polymer having a molecular weight of 18,000 (prepared from ethylene glycol of terephthalic acid and 3.0% of sulfoisophthalic acid). The reduction of polyphenol concentration was 11.62 percent.

EXAMPLE 6

One hectoliter of beer was filtered over a kieselguhr filter while a copolymer having a molecular weight of 14,000 (prepared from ethylene glycol of terephthalic acid and 3.9% of sulfoisophthalic acid) was added thereto. After filtration, it was ascertained that the polyphenol concentration in the beer decreased from its original value of 235.3 to 211.56 mg./liter, i.e. by about 10 percent. The treated beer evidenced a two months' colloidal stability prolongation when compared to the reference sample. The taste qualities of beer were stabilized for a 6 months' storage period.

What is claimed is:

1. Method for stabilizing the colloidal and taste qualities of beverages evidencing turbidity precursors and enzymes which comprises the steps of:
    (a) contacting the beverage with an organic polymer selected from the group consisting of polyethylene terephthalate, isophthalic acid modified polyethylene terephthalate, and a mixture of polyethylene terephthalate and polybutylene terephthalate and at a temperature ranging from 28.4° to 176° F., in an amount sufficient to reduce the concentration of cloudiness precursors and undesirable enzymes and
    (b) separating the polymer from said beverage.

2. Method in accordance with claim 1 wherein the organic polymer is polyethylene terephthalate.

3. Method in accordance with claim 1 wherein the organic polymer is a mixture of polyethylene terephthalate and polybutylene terephthalate.

4. Method in accordance with claim 1 wherein the organic polymer is isophthalic acid modified polyethylene terephthalate.

5. Method in accordance with claim 1 wherein the organic polymer is dispersed in powder form in the beverage.

6. Method in accordance with claim 1 wherein the organic polymer is separated from the beverage by filtration.

7. Method in accordance with claim 1 wherein the organic polymer is separated from the beverage by sedimentation.

8. Method in accordance with claim 1 wherein the beverage is contacted with the organic polymer in a continuous throughflow plant.

9. Method in accordance with claim 1 wherein contacting is effected by flowing the beverage through a layer of pulverulent organic polymer.

10. Method in accordance with claim 1 wherein contacting is effected by flowing the beverage through a layer of fibrous organic polymer.

11. Method in accordance with claim 9 wherein the organic polymer includes a filtering material.

12. Method in accordance with claim 11 wherein the filtering material is an inorganic compound.

13. Method in accordance with claim 11 wherein the filtering material is an organic compound.

* * * * *